United States Patent [19]

Gardner et al.

[11] Patent Number: 5,216,689
[45] Date of Patent: Jun. 1, 1993

[54] SLAB LASER WITH ENHANCED LIFETIME

[75] Inventors: Phillip J. Gardner, Cupertino; Donald E. Smith, San Jose; Joseph L. Dallarosa, Redwood City; Wayne S. Mefferd, Los Altos Hills, all of Calif.

[73] Assignee: Coherent, Inc., Palo Alto, Calif.

[21] Appl. No.: 838,552

[22] Filed: Feb. 19, 1992

Related U.S. Application Data

[63] Continuation-in-part of Ser. No. 596,788, Oct. 12, 1990, Pat. No. 5,123,028.

[51] Int. Cl.$^5$ .............................. H01S 3/097
[52] U.S. Cl. .................... 372/87; 372/103; 372/59; 372/64
[58] Field of Search ............... 372/64, 87, 59, 66

[56] References Cited

U.S. PATENT DOCUMENTS

| | | | |
|---|---|---|---|
| 4,229,709 | 10/1980 | McMahan | 372/59 |
| 4,617,668 | 10/1986 | Rudko et al. | 372/59 |
| 4,719,639 | 1/1988 | Tulip | 372/66 |
| 4,939,738 | 7/1990 | Opower | 372/95 |
| 5,043,997 | 8/1991 | Morrow et al. | 372/87 |
| 5,048,048 | 9/1991 | Nishimae et al. | 372/95 |
| 5,088,102 | 2/1992 | Krueger et al. | 372/64 |
| 5,123,028 | 6/1992 | Hobart et al. | 372/95 |
| 5,131,003 | 7/1992 | Mefferd . | |
| 5,131,004 | 7/1992 | Dallarosa et al. . | |

OTHER PUBLICATIONS

A. Gabai, R. Hertzberg, & S. Yatsiv, "Radio-Frequency Excited Stripline CO and $CO_2$ Lasers," an Abstract presented at Conference on Lasers and Electro-Optics, Jun. 1984.

P. E. Jackson, H. J. Baker, & D. R. Hall, "$CO_2$ Large-Area Discharge Laser Using an Unstable-Waveguide Hybrid," *Appl. Phys. Lett.*, vol. 54, No. 20, May 15, 1989, pp. 1950–1952.

R. Nowak, H. Opower, K. Wessel, H. Krüger, W. Haas, & N. Wenzel, "Diffusionsgekühlte $CO_2$-Hochleistungslaser in Kompaktbauweise (Diffision-Cooled Compact $CO_2$ High Power Lasers," *Laser und Optoelektronik*, 23(3)/1991, pp. 68–81.

*Primary Examiner*—Léon Scott, Jr.
*Attorney, Agent, or Firm*—Limbach & Limbach

[57] ABSTRACT

A $CO_2$ slab laser is disclosed having a pair of spaced apart electrodes defining a rectangular discharge region. RF energy is fed through the electrodes to excite the $CO_2$ gas. A pair of mirrors are located adjacent the electrodes to define the resonant cavity. A recombinant surface is placed between the ends of the electrodes and the mirrors to quench oxidizing species generated by the discharge before they reach the mirrors. In this manner, the degradation of the mirrors is reduced so that the high power performance of the laser can be maintained. The recombinant surfaces can be defined by forming extension regions at the end of the electrodes between which the discharge is minimized. Alternatively, a mirror shield having a beam transmitting aperture can be used to quench the oxidizing species.

9 Claims, 4 Drawing Sheets

SLAB LASER WITH ENHANCED LIFETIME

This application is a continuation-in-part of prior copending application Ser. No. 07/596,788, filed Oct. 12, 1990 and now U.S. Pat. No. 5,123,028, issued Jun. 16, 1992.

TECHNICAL FIELD

The subject invention relates to an approach for preventing mirror degradation in a slab gas laser thereby maintaining maximum output power over a longer period of time.

BACKGROUND OF THE INVENTION

There has been considerable recent interest in developing $CO_2$ slab lasers. These lasers have been shown to generate high output powers in an efficient manner. Prior art references discussing such slab lasers include "Radio-frequency excited Stripline CO and $CO_2$ lasers," Gabai, Hertzberg and Yatsiv, Abstract presented at Conference on Lasers and Electro-optics, June 1984; U.S. Pat. No. 4,719,639, issued Jan. 12, 1988 to Tulip; U.S. Pat. No. 4,939,738 issued Jul. 3, 1990 to Opower and U.S. Pat. No. 5,048,048 issued Sep. 10, 1991 to Nishimae.

The assignee herein has developed a $CO_2$ slab laser which is described in a copending patent application Ser. No. 07/596,788, filed Oct. 12, 1990 now U.S. Pat. 5,38 herein by reference. The laser described therein includes a pair of spaced electrodes configured to define a rectangular discharge region. The lasing gas is excited by passing an RF current through the electrodes. A pair of mirrors are mounted at the ends of the electrodes to define the resonator.

In the preferred embodiment of the latter laser, the spacing between the electrodes is selected so that light is guided between the surfaces of the electrodes. In the wider dimension, the light propagates in free space and is confined by the resonator mirrors. As described in the above cited application, to maximize performance, the resonator mirrors are spherical and selected to define a stable resonant cavity along the waveguide axis (the axis extending between the electrodes) and an unstable resonator perpendicular thereto (the free space axis). In addition, the spacing between the end of the electrodes and the mirrors is selected so that the radius of curvature of the wavefront of the laser beam in the waveguide axis at the mirror location matches the radius of curvature of the mirrors selected for the unstable resonator. Since the mirrors are spaced from the end of the electrodes, the gas discharge tends to extend out to the very ends of the electrodes.

When this laser has been life tested at powers exceeding 150 Watts, the output power has begun to diminish after only a few hundred hours. This decrease in output power has been traced to the deterioration of the mirrors. As previously disclosed in the above cited application, mirror degradation at lower powers had been addressed by adding a very thin coating of thorium fluoride to the top surface of the mirror. Thorium fluoride is less reactive and helped to reduce the level of degradation of the mirrors. However, at higher powers, this protective overcoating has proved insufficient and the mirrors are still the primary lifetime limiting component of the laser.

An analysis of mirrors which have shown degradation at higher powers indicates that the problem arises due to an initial oxidation of the mirror coating. The oxidized layer has a much higher absorption loss than the coating in its initial state. This added loss leads to a power decline in the laser.

Oxidizing species are known to be generated in the gas discharge between the two electrodes. The species include oxygen atoms, ozone, excited oxygen molecules and possibly ions of either carbon monoxide, carbon dioxide or oxygen. Some of these species will escape the confines of the slab and begin diffusing away from the discharge region and towards the mirrors. Since the discharge region extends to the end of the electrodes, the possibility of the oxidizing species migrating to the mirrors is increased.

Accordingly, it is an object of the subject invention to reduce the effects of the discharge on the resonator mirrors.

It is a further object of the subject invention to control the amount of oxidizing species reaching the resonator mirrors.

It is another object of the subject invention to enhance the lifetime and improve the performance of a slab laser.

SUMMARY OF THE INVENTION

In accordance with these and other objects, the subject invention addresses the problem of mirror degradation in slab laser. The slab laser includes a pair of planar electrodes which are spaced apart to define a rectangular discharge region. A lasing gas is excited by passing an RF current through the electrodes. A pair of mirror are located near the ends of the electrodes to define the resonator.

In accordance with the subject invention, a recombinant surface is provided between the ends of the electrodes and the mirrors. The recombinant surface functions to quench the oxidizing species prior to reaching the mirrors. In this manner, the rate of oxidation of the mirrors is reduced so that absorption loss is minimized and the maximum power output can be maintained over a longer period of time.

Several examples of the type of reaction which can take place at the recombinant surface are indicated below. In these examples, the recombinant surface is noted as R. Two of the possible recombinant reactions of oxygen atoms, O, involve the formation of oxygen molecules, $O_2$, and carbon dioxide molecules, $CO_2$, as indicated below:

$$O + O + R \rightarrow O_2 + R + \text{energy}$$

$$CO + O + R \rightarrow CO_2 + R + \text{energy}$$

A possible reaction of an excited oxygen molecule, $O_2^*$, leads to the formation of an oxygen molecule in the ground state, $O_2$, as indicated:

$$O_2^* + R \rightarrow O_2 + R + \text{energy} \qquad (3)$$

A possible ion reaction involving an oxygen ion, $O_2$, leads again to an oxygen molecule in the ground state as one of the products:

$$O_2^- + R \rightarrow O_2 + R^- + \text{energy} \qquad (4)$$

In all of these reactions the critical role of the recombinant surface is to carry away the energy change of the reaction and thus make possible the elimination of the reactive species. In the case of ionic reactions, it can also conduct away the charge carried by the ionic reactant.

The recombinant surface can be configured in a variety of ways. In one approach, a region at the end of the electrodes is provided where no discharge is present. Since there is no discharge in this region, the surfaces can function to recombine the oxidizing species. The rate of recombination at this surface is significantly greater than the deactivation rate which occurs simply through gas to gas collisions. The recombinant surface at the end of the electrodes can be configured by forming a recessed shelf directly into the electrodes themselves. Alternatively, ceramic extension members can be affixed to the ends of the electrodes.

Another approach for achieving this goal is to provide the recombinant surface in the form of a mirror shield. In the preferred embodiment, the mirror shield has a planar configuration and includes an aperture for transmitting the beam. The shield can be formed from either metal or ceramic. The shield can be supported from either the mirror mount or the end of an electrode.

Further objects and advantages of the subject invention will become apparent from the following detailed description taken in conjunction with the drawings in which:

DETAILED DESCRIPTION OF THE PREFERRED EMBODIMENTS

Figure 1:
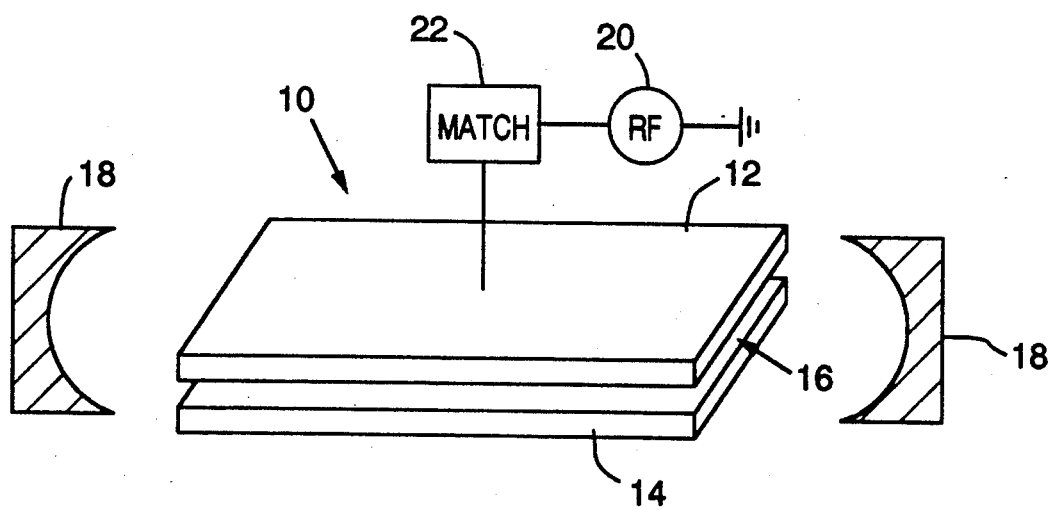
FIG. 1 is a perspective view of a typical slab laser found in the prior.

Turning to FIG. 1, there is illustrated a slab laser 10 of the type found in the prior art. Additional details concerning a preferred embodiment of a $CO_2$ slab laser can be found in the above cited copending application Ser. No. 07/596,788. Briefly, laser 10 includes a pair of elongated, planar electrodes 12 and 14 formed from a conductive metal such as aluminum. The electrodes are supported in spaced apart relationship to define a discharge region 16 having a rectangular cross section. A pair of mirrors 18 are disposed adjacent the ends of the electrodes to define the resonant cavity.

As described in the above cited application, the mirrors and electrodes are located within a sealed housing (not shown). A lasing gas, for example $CO_2$, is sealed within the housing. The gas is excited by supplying RF power from a generator 20 to the electrodes. An impedance matching network 22 is used to match the RF generator to the excited discharge.

In the preferred embodiment of the subject laser, the spacing between the electrodes 12, 14 is selected so that light will be reflected or guided off of the surfaces in the axis extending between the electrodes. The spacing is preferably on the order of 1.5 to 2.5 mm. The width of the electrodes is selected so that the light in the axis perpendicular to the waveguide axis will travel in free space. Applicants have tested electrodes of various widths ranging from 20 mm to 120 mm. The propagation of the beam will be controlled by the mirror 18 in the free space axis.

As noted above, in the structure illustrated in FIG. 1, the mirror surfaces become significantly degraded over time when the laser is operated at high power. As the mirrors degraded, absorption increased and the output power diminished. The degradation of the mirrors appears to have been caused by oxidizing species which escape the discharge region and migrate to the mirrors. It has been found that the degradation can be substantially retarded by providing a recombination surface between the ends of the electrodes and the mirrors.

Figure 2:
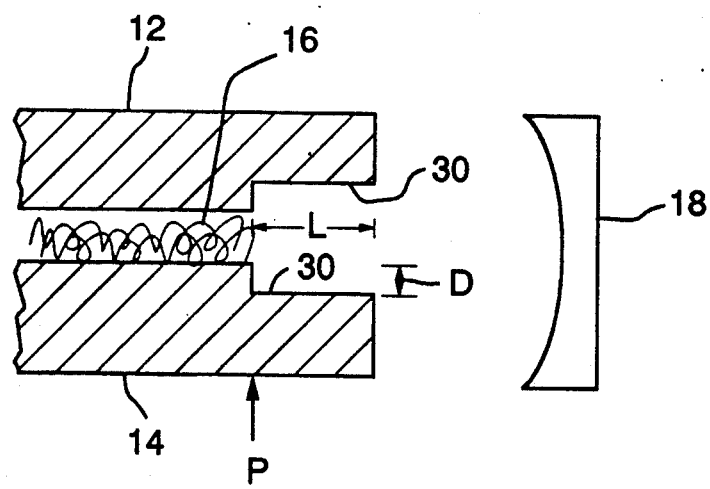
FIG. 2 is a cross-sectional view of the electrodes of a slab laser provided with a recombinant surface in accordance with a first embodiment of the subject invention.

FIG. 2 illustrates a first approach for providing a recombination surface. As illustrated therein, the ends of each of the electrodes 12, 14 is provided with a recessed shelf 30. In one experimental arrangement, the depth D of the recess was 5.0 mm so that the total spacing between the surfaces was 5 mm. The length L of the recess was 10 mm. The opposed recessed shelves 30 function to significantly increase the spacing between the electrodes in this region. Because of the spacing increase, the extent of the gas discharge 16 in this region is substantially reduced. Accordingly, the planar surfaces of the shelves can act as a recombinant surface for quenching the oxidizing species before they reach the mirrors. In this embodiment as well as the others to be discussed below, it is intended that regions at both ends of the electrodes be modified as shown in the Figures.

As disclosed in the prior application, in order to maximize performance, it is desirable to set the spacing between the electrodes and the mirrors so that the radius of curvature of the wavefront of the laser beam in the waveguide axis at the mirror location matches the radius of curvature of the mirror selected for the unstable resonator. This approach assumes that the beam is confined in the waveguide dimension as it exits the electrode structure. In the embodiment shown in FIG. 2, the waveguide structure terminates at point P and the beam then begins to propagate in free space in the region of the recessed shelves where the separation between the electrodes is increased. For this reason, when designing the resonator dimensions, the "end" of the electrode should be considered based on the location of point P rather than the physical end of the electrode.

Figure 3:
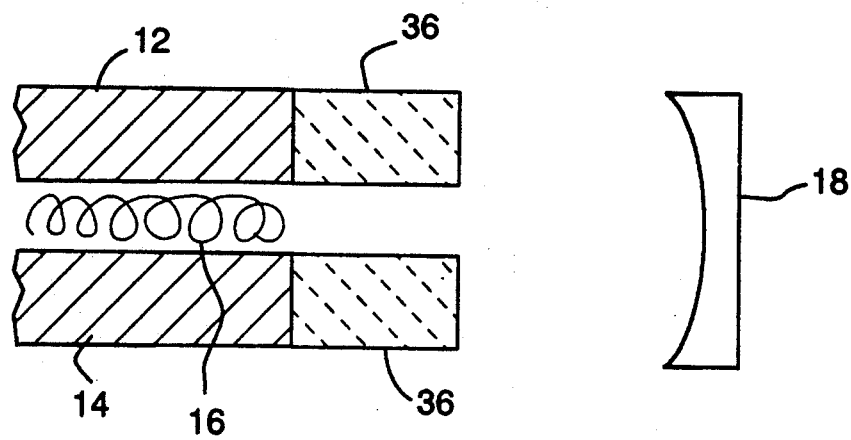
FIG. 3 is a cross-sectional view of the electrodes of a slab laser provided with a recombinant surface in accordance with a second embodiment of the subject invention.

FIG. 3 illustrates an alternate embodiment where the recombinant surface is defined by a nonconductive insulator added as extension member 36 to the ends of the electrodes 12 and 14. Preferably, the extension member 36 is formed from a ceramic material. Since the RF energy will not be carried by the member 36, the discharge 16 will essentially terminate at the end of the aluminum electrodes. Accordingly, the members 36 will provide a recombinant surface for quenching the oxidizing species prior to reaching the mirrors.

In the embodiment illustrated in FIG. 3, the spacing between the ceramic members 36 is the same as the spacing between the electrodes 12, 14. Therefore, the waveguide action will be maintained throughout the region of the members 36. Thus, in order to maximize performance, the mirror spacing should be based on the total length of the electrodes plus the members 36.

Figure 4:
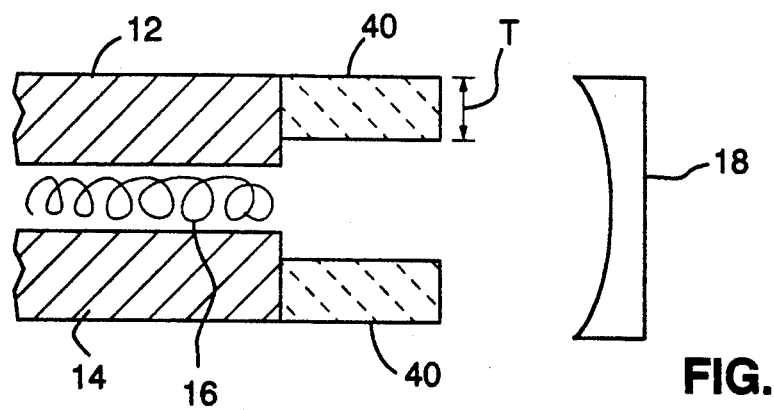
FIG. 4 is a cross-sectional view of the electrodes of a slab laser provided with a recombinant surface in accordance with a third embodiment of the subject invention.

The embodiment of FIG. 4 represents a combination of the approaches shown in FIGS. 2 and 3. More specifically, a pair of ceramic extension members 40 are connected to the ends of the electrodes 12, 14. In this case, the thickness T of the members 40 is less than the thickness of the electrodes so that the composite structure has dimensions similar to the structure in FIG. 2. The combination of the ceramic members with the recessed shelf configuration further minimizes the amount to which the discharge 16 will extend past the end of the conductive electrodes. Members 40 provide the recombinant surface for quenching the oxidizing species. Like the embodiment in FIG. 2, since the waveguide action terminates where the shelf structure begins, the mirror spacing should be determined from the actual end of the conductive electrode. The approach shown in FIG. 3 may be preferable to that shown in FIG. 4 because it might minimize waveguide losses.

Figure 5:
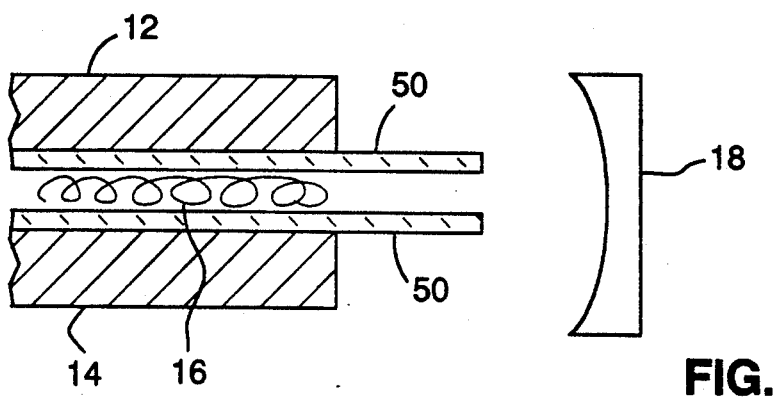
FIG. 5 is a cross-sectional view of the electrodes of a slab laser provided with a recombinant surface in accordance with a fourth embodiment of the subject invention.

FIG. 5 illustrates another embodiment of the subject invention. In this embodiment, a ceramic cover plate 50 is attached to the opposed inner surface of each of the electrodes 12 and 14. The ceramic plates have a thickness on the order of 2 mm. Each of the cover plates extends beyond the ends of the electrodes a distance $D_2$ of 10 mm. The surfaces of the plates extending beyond the electrodes defines the recombinant surfaces. Since the separation between the plates remains constant to the end, the plates act as the waveguide structure and the mirror spacing should be calculated from the end of the plates 50.

Figure 6:
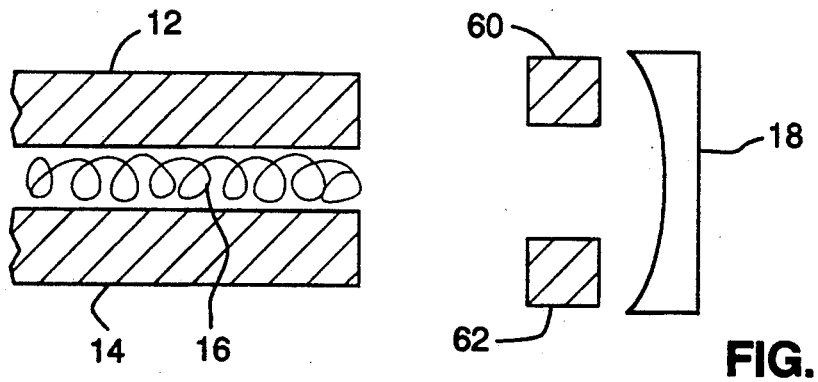
FIG. 6 is a cross-sectional view of a slab laser provided with a recombinant surface in the form of a mirror shield in accordance with a fifth embodiment of the subject invention.

FIGS. 6 through 10 illustrate recombinant surfaces oriented in a plane perpendicular to the axes of the resonant cavity. In FIG. 6, the recombinant surface is defined by a planar mirror shield 60. The mirror shield 60 has a central aperture 62 which is aligned with the mirror 18 and transmits the laser beam. The shield can be formed from metal or ceramic. In either case, the shield functions to quench the oxidizing species before reaching the mirror.

Figure 7:
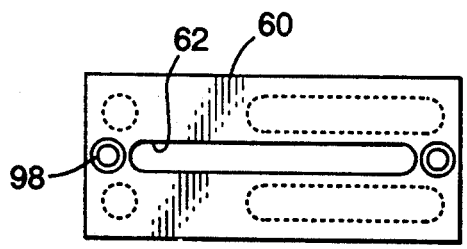
FIG. 7 is a front elevational view of a mirror shield as used in the preferred embodiment a $CO_2$ slab laser.
Figure 8:
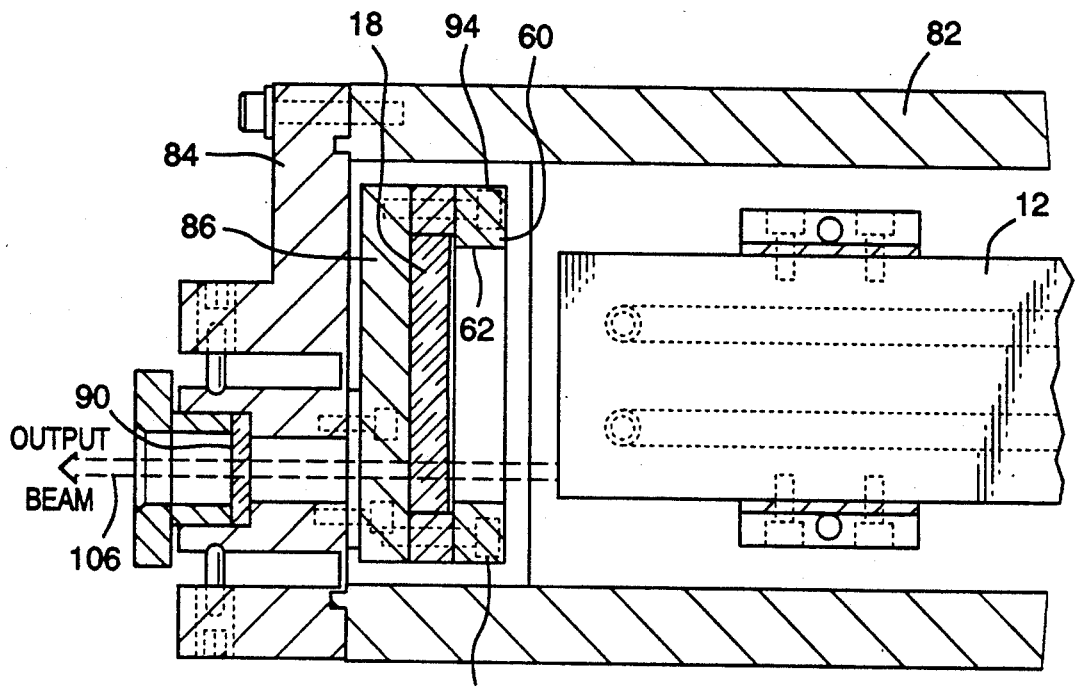
FIG. 8 is a top cross sectional view of a preferred embodiment of a $CO_2$ slab laser incorporating the mirror shield of FIG. 7.
Figure 9:
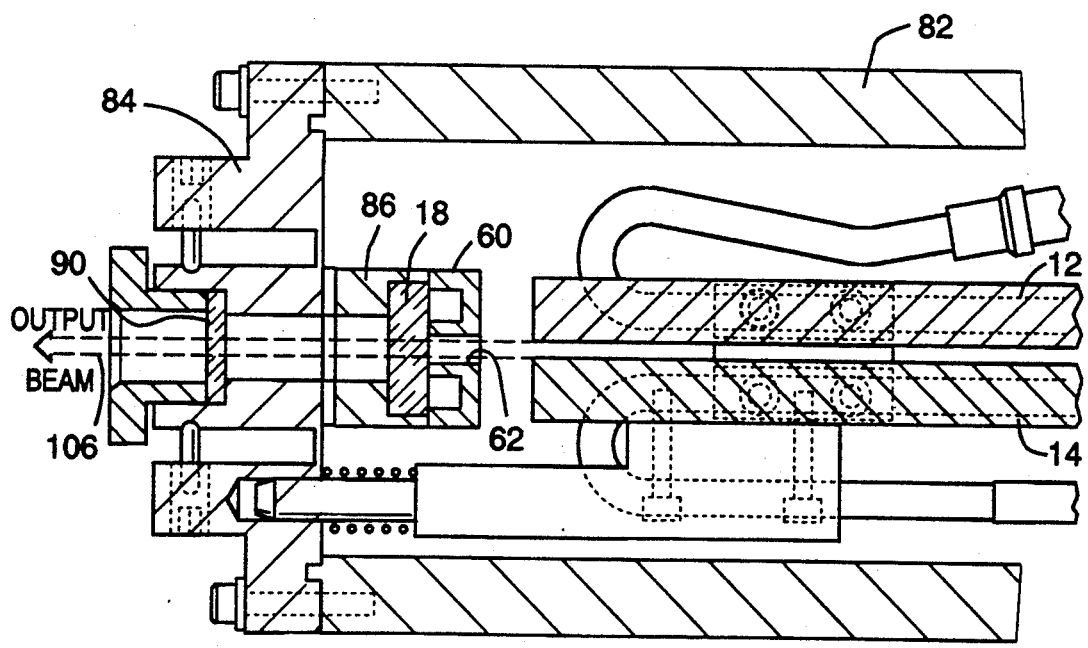
FIG. 9 is a side cross sectional view of the $CO_2$ slab laser of FIG. 8 incorporating the mirror shield of FIG. 7.

FIG. 7 is a plan view of a mirror shield 60 which has been tested in a laser of the type described in the above identified application. FIGS. 8 and 9 illustrate the mirror shield 60 mounted within such a laser. In these Figures, the electrodes 12 and 14 are mounted within a sealed housing 82. The end of the housing is sealed with an end cap 84. This end cap includes a mirror mount 86 for supporting mirror 18. The end of the laser which is illustrated is also the output coupler so an output window 90 is also shown. Further details of the assembly can be found in the above identified application.

In accordance with the subject invention, the mirror shield 60 is mounted to the mirror mount 86 by a pair of mounting screws 94. In the experimental embodiment, the mirror shield was formed from aluminum and the screws 94 were formed from stainless steel. In this manner, an electrical connection was established between the shield 60 and the grounded mirror mount 86. This approach is preferred to maximize the attraction of any ionized oxidized species to the shield.

Shield 60 is rectangular and has generally planar surfaces. The beam transmitting aperture 62 is elongated and had a height of 5.1 mm and a width of 50 mm. The shield includes holes 98 for receiving mounting screws 94. The detents shown in phantom line in FIG. 7 are provided to accommodate other mirror mounting hardware. The shield 60 was used in a laser where the electrodes had a width of 44 mm. The laser beam 106 is edge coupled out of the resonator, past the end of mirror 18 and through aperture 62.

Figure 10:
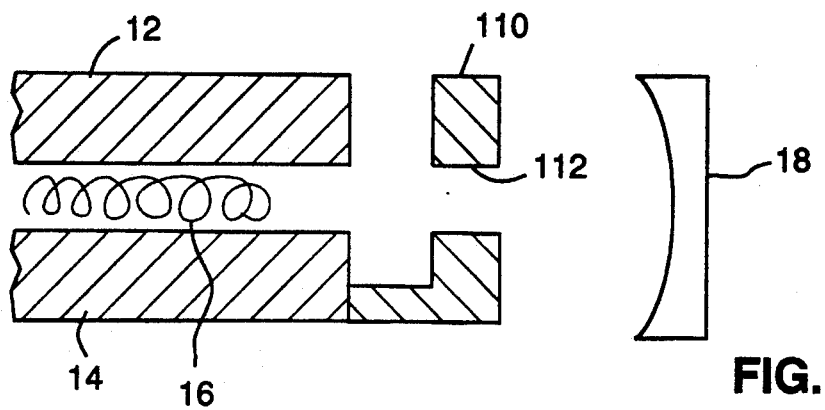
FIG. 10 is a cross-sectional view of a slab laser provided with a recombinant surface in the form of a mirror shield in accordance with a sixth embodiment of the subject invention.

FIG. 10 illustrates an alternate embodiment utilizing a mirror shield 110 having an aperture 112 for transmitting the beam. In this embodiment, the shield 110 is mounted to the end of the electrode 14 rather than to the mirror mount as in FIGS. 8 and 9. The connection to the electrode can be achieved in any suitable manner. In the embodiments shown in FIGS. 6 through 10, the mirror spacing should be determined as in the basic structure shown in FIG. 1 since the waveguide effect ends at the end of the electrodes.

A few of the approaches discussed above have been fabricated and tested. More specifically, the approaches shown in FIGS. 1 and 6 have been shown to be effective in reducing the degradation of the mirrors. Based on this testing, it appears that the approach shown in FIG. 6 will achieve more consistent results.

Figure 11:
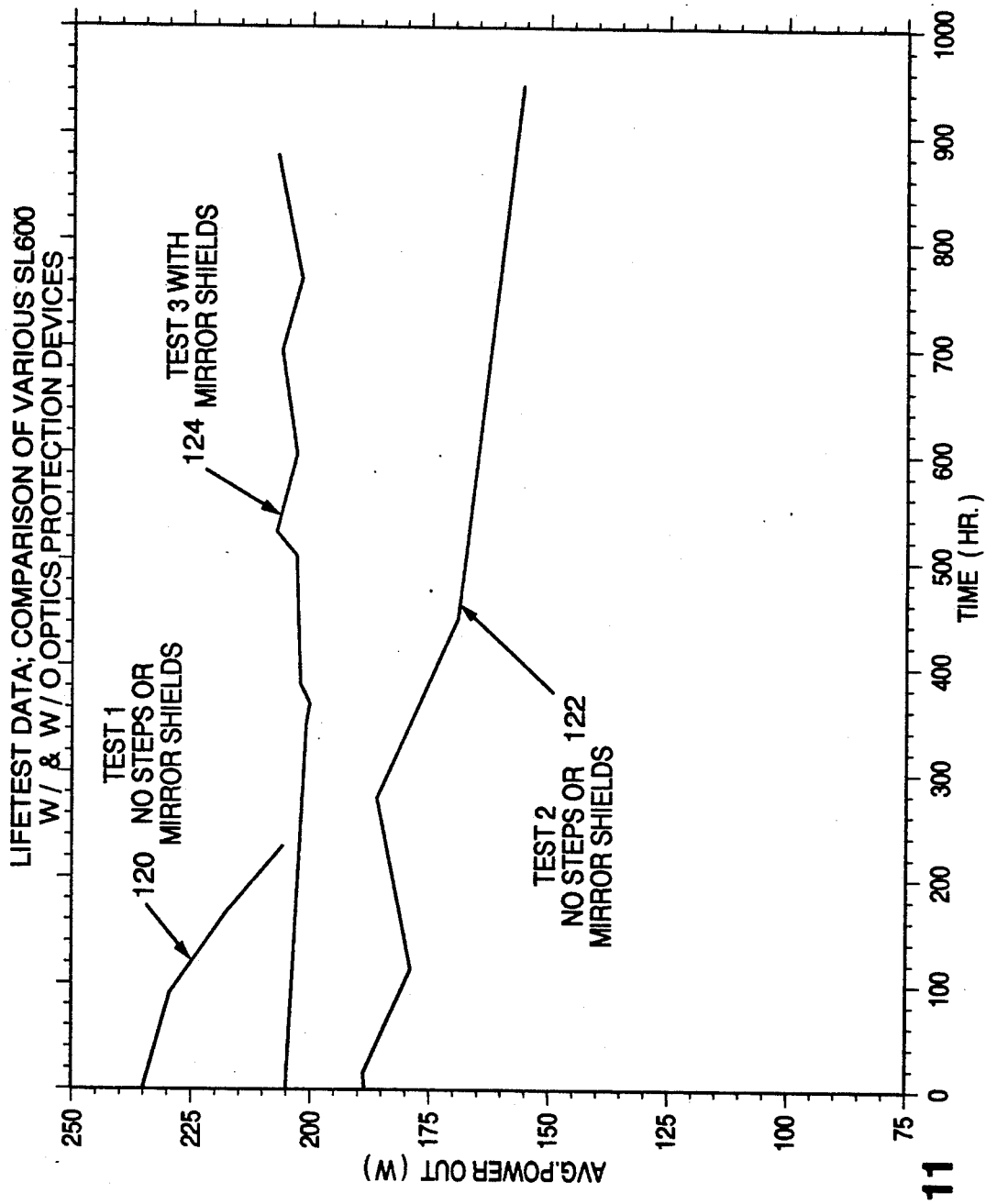
FIG. 11 is a graph comparing the operation of a laser with and without a recombinant surface formed in accordance with the subject invention.

FIG. 11 is a graph of life test data on slab lasers having about a 65 cm overall length. For these life tests, the laser devices were excited by a pulsed radio-frequency power supply operating at 81 MHz. The peak power was 5500 watts with pulse width of 400 to 500 $\mu$s at frequencies of 1000 Hz. The gas laser mix was in a ratio of 3:1:1 for helium, carbon dioxide, and nitrogen plus the addition of 5% xenon to a total initial pressure of 80 torr. The laser resonator consisted of two high reflecting mirrors with radii of curvature of 693 mm for the high reflecting end and 619 mm for the output end of the tube. The output mirror was cut shorter so that a 4.7 mm beam is allowed to diffract around this edge in a negative branch unstable resonator. The mirrors were separated by 656 mm while the electrodes used had an overall length of 616 mm and a width of 44 mm. The electrodes were separated by 1.9 mm. Each mirror consisted of a silicon substrate with an enhanced gold coating. The top layer of the dielectric stack was approximately tenth wave thickness of thorium tetrafluoride. The dielectric stack of zinc sulfide and thorium tetrafluoride was used to enhance the mirror reflectivity at 10.6 $\mu$m to >99.5%.

Curves 120 and 122 represent laser tubes formed in accordance with the prior art. As can be seen, as the tubes are run at increasingly higher powers, the output power tends to drop off at increasingly faster rates. Curve 124 is a plot of a tube with mirror shields of the type shown in FIGS. 8 and 9. As can be seen, this tube has been run for almost 900 hours at an average power in excess of 200 Watts with almost no appreciable drop in that power. Testing on this tube is continuing. This preliminary data indicates that the shields are functioning as recombinant surfaces for quenching the oxidizing species before they reach the mirror.

While the subject invention has been described with reference to the preferred embodiments, various changes and modifications could be made therein, by one skilled in the art, without varying from the scope and spirit of the subject invention as defined by the appended claims.

We claim:

1. A laser comprising:

a pair of elongated electrodes, said electrodes being spaced apart and configured to define a discharge region therebetween;

a lasing gas located between said electrodes;

means for energizing the electrodes to excite the gas and generate a gas discharge that includes oxidizing species;

a pair of mirrors located adjacent the ends of said electrodes and defining the resonator; and recombinant surface means located between the ends of the electrodes and the mirror wherein said ends of said electrodes are provided with extension members between which the excitation of the gas is substantially reduced and wherein said extension members define said recombinant surface means; said recombinant surface means quenching the oxidizing species generated in the discharge before reaching the mirrors to thereby reduce mirror degradation.

2. A laser as recited in claim 1 wherein said extension members are defined by recessed shelves formed in the ends of said electrodes.

3. A laser as recited in claim 1 wherein said extension members are formed from a ceramic material.

4. A laser as recited in claim 3 wherein said ceramic extension members are configures to define recessed shelves.

5. A laser as recited in claim 1 further including a pair of ceramic plates formed on the opposed surfaces of said electrodes, said plates extending beyond the ends of said electrodes.

6. A laser comprising:

a pair of elongated electrodes, said electrodes being spaced apart and configured to define a discharge region therebetween;

a lasing gas located between said electrodes;

means for energizing the electrodes to excite the gas and generate a gas discharge that includes oxidizing species;

a pair of mirrors located adjacent the ends of said electrodes and defining a resonator for producing a laser beam; and a a pair of shield members located between the ends of the pair of electrodes and the associated mirror, said shield members having an aperture formed therein and aligned with the mirror, said aperture being of sufficient dimensions so as not to substantially interact with said laser beam, said shield member quenching the oxidizing species generated in the discharge before reaching the mirrors to there by reduce minor degration.

7. A laser as recited in claim 6 wherein said shield member is oriented perpendicular to the axis of the resonator.

8. A laser as recited in claim 6 wherein said shield member is formed from metal.

9. A laser as recited in claim 6 wherein said shield member is formed from ceramic.

* * * * *